Dec. 16, 1969   DE WITT C. MacKALLOR, JR   3,484,635

BRUSHLESS MOTOR/ALTERNATOR

Filed Jan. 16, 1968

INVENTOR.
De WITT CLINTON MacKALLOR, JR.

BY

*H. H. Leeke*
Attorney

United States Patent Office 3,484,635
Patented Dec. 16, 1969

3,484,635
BRUSHLESS MOTOR/ALTERNATOR
DeWitt C. MacKallor, Jr., Palos Verdes, Calif., assignor, by mesne assignments, to the United States of America as represented by the Secretary of the Navy
Filed Jan. 16, 1968, Ser. No. 698,305
Int. Cl. H02k 1/22
U.S. Cl. 310—266                           1 Claim

ABSTRACT OF THE DISCLOSURE

A brushless motor/alternator having stationary stator and exciter windings with an air gap therebetween within a motor housing and a cylindrical rotor with diametrically opposed sections of magnetic material separated by sections of nonmagnetic material, the rotor enclosing the exciter winding and rotatable in the air gap within the stator winding with a shaft extension to the housing exterior.

BACKGROUND OF THE INVENTION

Motors and alternators of the brushless type are known but many of these are bulky and heavy for the amount of input or output power provided. Many of these brushless type machines have a conducitve but nonmagnetic cylindrical rotor which is rotated by eddy current forces induced in it that react with the rotating field of the stator for motor action. Operating as an alternator, the exciter winding is energized to establish a flux in the exciter core, the flux lines of which pass through the rotor which is power rotated and causes the flux to loop the stator core to establish alternating current in the stator winding.

SUMMARY OF THE INVENTION

In the present invention, a motor or alternator device has a case with a stator winding therein encircling a rotor and exciter winding. The rotor is a cylindrical member having permanent magnet pole sections arranged in a skewed manner with alternate nonmagnetic skewed sections. The rotor is journaled within the motor or alternator case with a shaft extension to the case exterior. The cylindrical member has end plates on which the journals and shaft extension are fixed, one end plate having a ninety degree sector of magnetic material and the other end plate having a ninety degree sector of magnetic material. These magnetic pole sectors mate with the magnetic pole sections, respectively, of the cylinder. Journaled within the cylindrical rotor is an exciter core member having a hollow shaft extension keyed to the case to prevent rotation thereof. The exciter core supports an exciter winding having leads extending to the case exterior through the exciter core hollow shaft extension. The construction permits the device to operate as either an electric motor or alternator generator. It is therefore a general object of this invention to provide a brushless motor or alternator having a cylindrical rotor rotatable in an air gap between stationary stator and exciter windings, said rotor having permanent magnet members separated by nonmagnetic members in skewed configuration circumferentially around the cylindrical rotor to produce a compact, light weight, and efficient motor or alternator.

BRIEF DESCRIPTION OF THE DRAWING

These and other objects, advantages, features, and uses will become more apparent to those skilled in the art as a more detailed description proceeds when considered along with the accompanying drawing, in which.

DESCRIPTION OF THE PREFERRED EMBODIMENT

Figure 1:
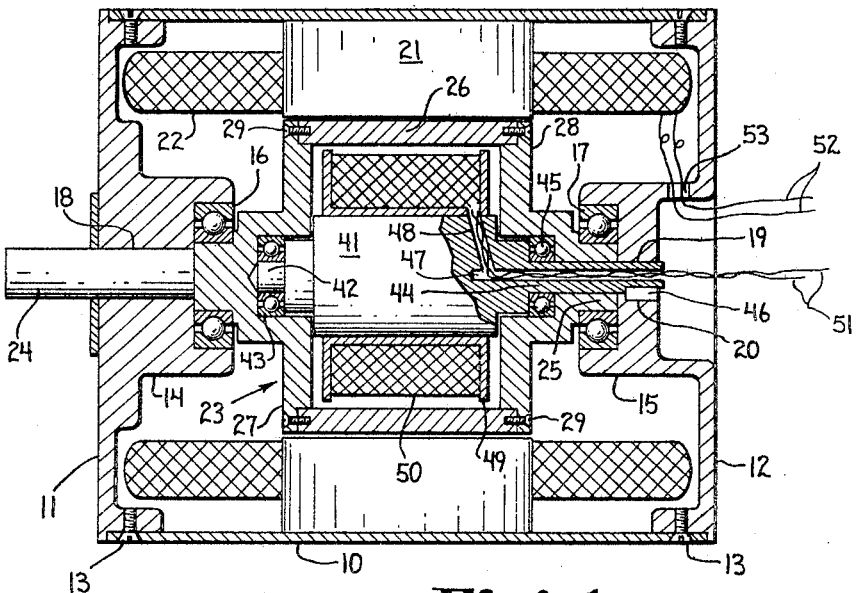
FIGURE 1 is a longitudinal cross-sectional view of the motor or alternator device of this invention showing some parts in elevation.

Referring more particularly to FIGURE 1, a motor housing or case is formed by a cylindrical member 10 having end plates 11 and 12 secured thereto by screws 13. Each end plate has a central hub portion 14 and 15, respectively, for supporting the outer races of ball bearings 16 and 17. The end plate 11 has a shaft opening 18 and the end plate 12 has a shaft opening 19 with a key slot 20, for the purpose soon to be described.

Within the housing or case, just described, is a stator core laminated stack 21, preferably of silicon transformer iron but may be of "Permendur" material, that supports a stator winding 22. Journaled on the ball bearings 16 and 17 is a rotor, designated generally by the reference character 23, having a shaft 24 extending through the shaft opening 18 and supported in the inner race of ball bearing 16, and having a stub shaft 25 supported in the inner race of ball bearing 17. The rotor, generally, is a cylindrical member 26 supported by end plates 27 and 28 and held together by screws 29. The particular construction of the rotor 23 will be more fully described with reference to FIGURE 2.

Journaled within the rotor 23 is an exciter core 41, preferably of solid "2V Permendur" magnetic material, having a stub shaft 42 supported in the inner race of a ball bearing 43, the outer race of which is in a bore of the hub in end plate 27. The other end of rotor 23 has a shaft extension 44 supported in the inner race of a ball bearing 45, the outer race of which is supported in a bore of the rotor end plate 28. The shaft extension 44 passes through a counterbore in the end plate 28 and through the bore 19 of the case end plate 12 with a key 46 in key slot 20 holding the exciter core against rotation with respect to the housing or case 10–12. The exciter core 41 and shaft extension 44 have the bores 47 and 48. An exciter core bobbin 49 is fitted over the exciter core 41 and retains an exciter core winding 50. The leads 51 for the exciter core winding 50 pass through the bore 47 and 48 to the exterior. Leads 52 from the stator core winding 22 pass through an opening 53 in the housing end plate 12 to the exterior near the leads 51 for ease of making electrical connections.

Figure 2:
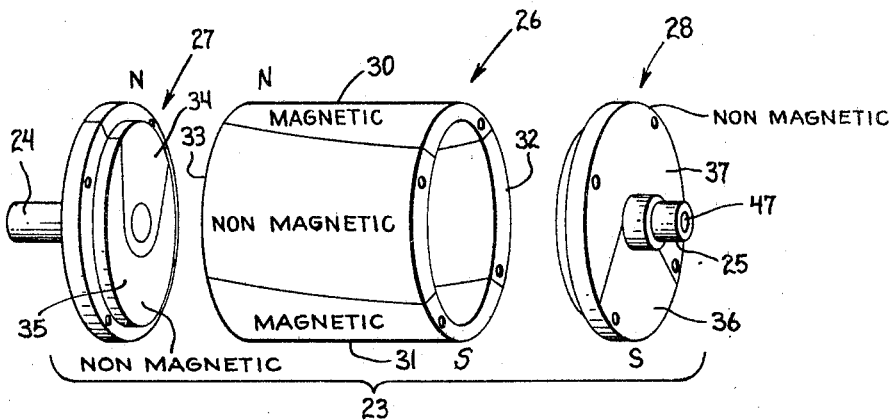
FIGURE 2 is an exploded isometric view of the rotor, shown in cross-section in FIGURE 1.

Referring more particularly to FIGURE 2 wherein like reference characters represent like parts to those in FIGURE 1, the cylindrical element 26 consists of two quarter sections 30 and 31 of soft permanent magnetic material, such as 2V Permendur material or the like, separated by two quarter sections 32 and 33 of nonmagnetic material, such as stainless steel or the like, in a skewed configuration, as common in induction motors for similar purposes. The magnetic material establishes north (N) and south (S) poles, or the reverse, by eddy current induction, as illustrated by way of example in this figure. The end plate 27 has a 90 degree quarter sector 34 of soft magnetic material, such as 2V Permendur, at the periphery and the remainder 35 of nonmagetic stainless steel material. The end plate 28 has a 90 degree quarter sector 36 of soft magnetic material, such as 2V Permendur, at the periphery and the remainder 37 of nonmagnetic stainless steel material. The end plate 27 is secured to the cylindrical member 26 with the soft magnetic portions coinciding and the end plate 28 is secured to the cylindrical member 26 with the soft magnetic portions coinciding. The assembled rotor, with the exciter core 41 and winding 50 enclosed therein, is mounted in the housing 10–12, as illustrated in FIGURE 1, allowing the rotor 23 to rotate freely with the cylindrical member 26 in the air gap between the stator 21 and exciter winding 50. While the soft magnetic material and nonmagnetic material are stated to be 2V Permendur and stainless steel (such as number 302 preferred) it is to be understood that the invention is not limited to these materials and other suitable materials could be used so long as they have the same densities, have the same coefficients of expansion, and be weldable.

OPERATION

In the operation of the motor or generator device, let it first be assumed that the device is to be used as a motor. The leads 52 in this example would be connected to an alternating current (A.C.) to energize the stator windings 22 on two poles, for example, This A.C. would set up a rotating field or field current which would establish north and south poles in the rotor 23 by eddy current induction to cause it to rotate and produce shaft 24 rotation. Relative motion between the stator field and rotor (slip) is necessary to generate these eddy currents. These induced poles "slip" around the rotor and, consequently, what at one instant was a north pole becomes a south pole, etc. This induction motor action is used to bring all wound field synchronous machines to near synchronous speed. Permanent poles appear on the rotor 23 only after it rotates synchronously with the field established by the stator 21, 22. The difference in the attraction between the soft magnetic 2V Permendur and the nonmagnetic stainless steel elements will cause the rotor 23 to lock in step with the rotating field of the stator 21, 22 if the external load and inertia on shaft 24 is small. At lock-in the device ceases to be an induction motor and becomes a synchronous motor. Normally synchronization is achieved—after induction motor operation has brought the rotor 23 to near synchronous speed—by suddenly applying field current or A.C. to the stator windings 22. Fixed magnetic poles then appear on the rotor 23 since there is no more slip between the rotor and stator poles and the rotor 23 locks in with the rotating field and becomes synchronous. Varying the field excitation changes the angle the magnetic sections 30, 31 and 34, 36 of the rotor 23 make with the rotating field of the stator 21, 22 (torque angle) as it changes the power factor of the current drawn.

In the operation of the device as an alternator the leads 51 are coupled to a D.C. source to establish flux lines out one end of the exciter core 41 through the end plate 28, for example, the cylindrical member 26, the stator core 21, back through the cylindrical member 26, the end plate 27, and into the core 41. The shaft 24 is powered by an external source to cause the cylindrical member 26 of the rotor 23 to rotate. Rotation of the rotor 23 through one pole pitch reverses the flux direction in the stator core 21. Rotation of the rotor 23, then, produces alternations in the stator windings 22 generating A.C. on the output terminals 52.

I claim:
1. A brushless electric motor or alternator comprising:
a housing having a cylindrical central member with a housing end plate closing each end;
a stator core affixed to the inner surface of said cylindrical central member with a stator winding thereon;
a rotor journaled in said housing end plates with a shaft extension through one of said housing end plates, said rotor including a cylindrical member of alternate quarter sections of magnetic and non-magnetic material joined together in skewed configuration placing said magnetic sections diametrically opposed and said non-magnetic sections diametrically opposed with rotor end plates enclosing each end of said cylindrical member, each rotor end plate consisting of a quarter sector of mganetic material and a three-quarter sector of non-magnetic material with each quarter sector of magnetic material mating respectively with one each quarter section of magnetic material of said cylindrical member placing the quarter sector and quarter section of magnetic material of one rotor end plate and of the cylindrical member diametrically opposite to said quarter sector and quarter section of magnetic material of the other rotor end plate and cylindrical member, said cylindrical member and rotor end plates producing a hollow portion within said rotor; and
an exciter core having an exciter winding thereon journaled within the hollow portion of said rotor and having a shaft extension through said rotor affixed to the other of said housing end plates whereby upon excitation of said stator windings to produce a rotating electric field the rotor would be rotated for power take-off of said shaft extension and upon excitation of said exciter winding and powered rotation of said rotor an alternating current will be generated in said stator windings.

References Cited

UNITED STATES PATENTS

| | | | |
|---|---|---|---|
| 3,319,100 | 5/1967 | Erickson | 310—263 XR |
| 3,321,652 | 5/1967 | Opel | 310—263 XR |
| 3,215,878 | 11/1965 | Woodward | 310—263 XR |
| 2,974,242 | 3/1961 | Apstein | 310—266 |
| 3,134,037 | 5/1964 | Upton | 310—266 |
| 3,303,369 | 2/1967 | Erickson | 310—266 XR |
| 2,896,101 | 7/1959 | Laskin | 310—171 |

MILTON O. HIRSHFIELD, Primary Examiner

B. A. REYNOLDS, Assistant Examiner

U.S. Cl. X.R.

310—67, 156